Figure 1:
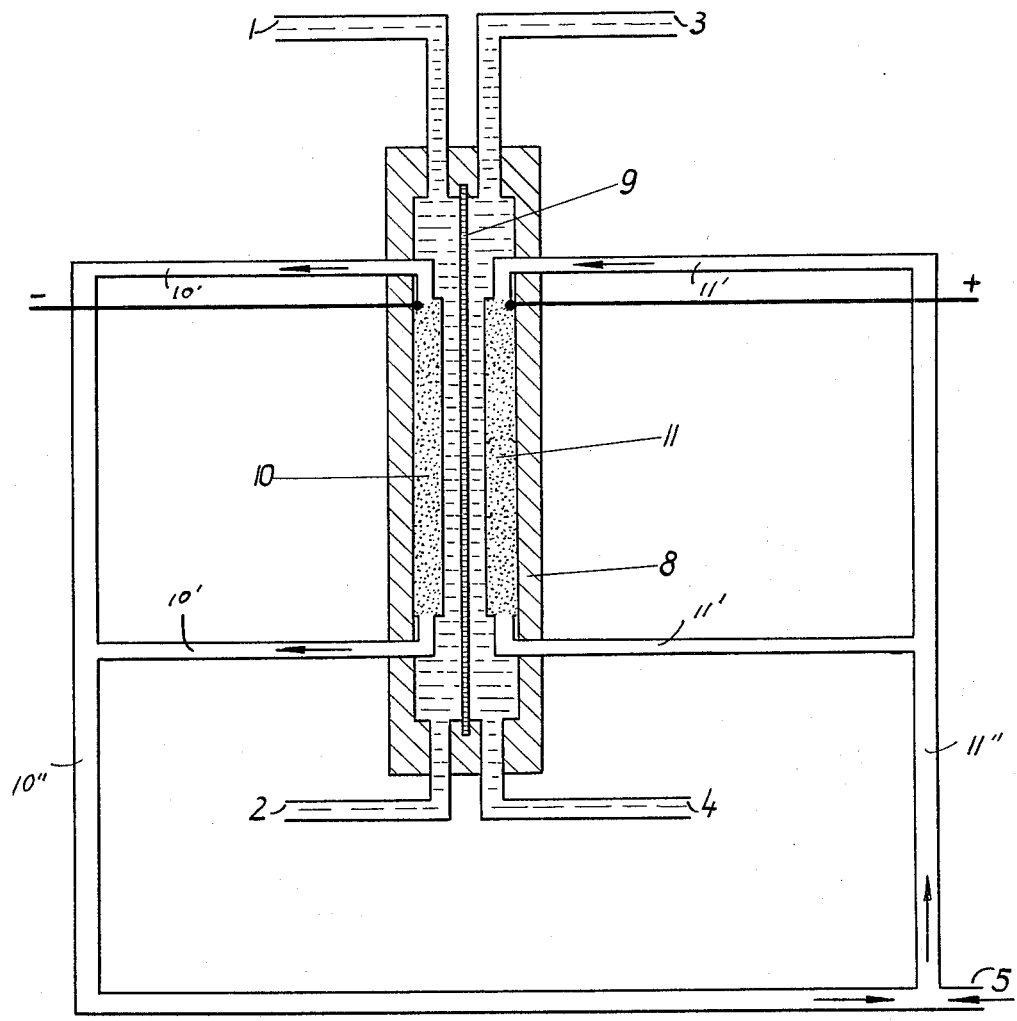

Nov. 1, 1966     E. JUSTI ETAL     3,282,834
PROCESS FOR REVERSIBLE ELECTRODIALYSIS

Filed Jan. 26, 1961     3 Sheets-Sheet 1

INVENTORS:
EDUARD JUSTI + AUGUST WINSEL
By Burgess, Dinklage & Sprung
ATTORNEYS

FIG. 2
FIG. 3
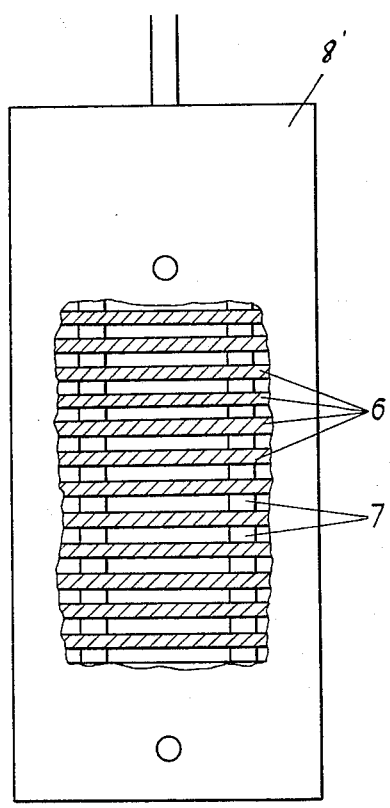
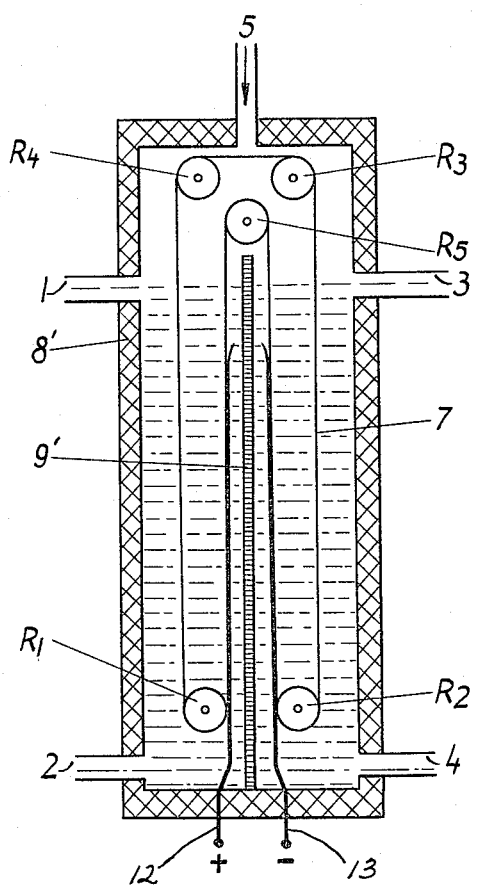
INVENTORS:
EDUARD JUSTI & AUGUST WINSEL

United States Patent Office 3,282,834
Patented Nov. 1, 1966

3,282,834
PROCESS FOR REVERSIBLE ELECTRODIALYSIS
Eduard Justi and August Winsel, Braunschweig, Germany, assignors, by mesne assignments, to Varta Aktiengesellschaft, Frankfurt am Main, Germany, and Siemens-Schuckert-Werke Aktiengesellschaft, Erlangen, Germany, both corporations of Germany
Filed Jan. 26, 1961, Ser. No. 85,163
Claims priority, application Germany, Jan. 30, 1960, R 27,218
2 Claims. (Cl. 204—180)

The present invention relates to a process for the reversible electrodialysis of solutions in cells having a dialysis membrane between anode and cathode without electrochemical loss of solvent and energy.

Upon the electrodialysis of monovalent salt AB in aqueous solution having the anion $A^-$ and the cation $B^+$, the anion $A^-$ migrates into the anode space and there forms the acid HA, and the cation $B^+$ migrates into the cathode space and there forms the base BOH. Generally, a membrane provided between the electrodes prevents by far the neutralization which otherwise would occur due to convection and diffusion of the reaction substances within the system.

In the ideal case, the energy afforded for the separation into the said acid and base, equals the energy of neutralization. This ideal case is nearly realized at ion exchange membranes if the current is carried only by one kind of ions in the membrane, which therefore possesses the transport number or transference number 1.

In those cases where the ions to be separated are not evolved themselves at the electrodes, great energy losses occur during electrodialysis, since ions resulting from the solvent are actually evolved during electrodialysis. For instance, during electrodialysis of aqueous systems, in most cases decomposition of water occurs. Insofar as the evolved hydrogen and oxygen are not technically used, the energy used up for their revolution represents a loss, which minimizes the economy of the said electrodialysis process. For instance, the preparation of water for human consumption by electrodialysis of sea water at ion exchange membranes becomes uneconomical owing to the evolution of $H_2$ and $O_2$, which generally cannot be utilized effectively at sea.

It is an object of the present invention to overcome the foregoing disadvantages of the prior art and to provide a process for the efficient reversible electrodialysis of solutions in cells having at least one dialysis membrane between the anode and cathode of the cell so that substances evolved from ions at one electrode may be recovered and passed to the opposite electrode for electrochemical dissolution without substantially any loss of substances or energy during the over-all electrodialysis.

Figure 4:
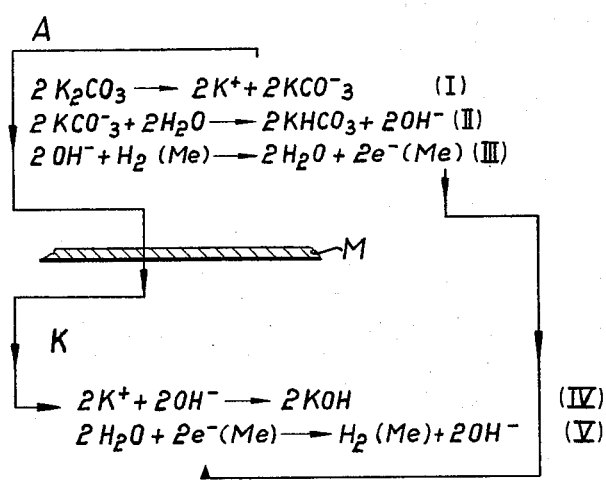

Other and further objects of the invention will become apparent from a study of the within specification and accompanying drawings in which:

FIG. 1 schematically illustrates an electrodialysis cell device for use in accordance with the present invention indicating the provision for passage of electrolyte through the cell chambers on each side of the dialysis membrane and the flow path of gas from one electrode to the other externally of the electrolyte;

FIG. 2 schematically illustrates an electrodialysis cell in accordance with another embodiment of the invention utilizing gas storing electrodes, with a portion of the cell wall broken away to illustrate details of construction;

FIG. 3 is a schematic sectional view of the cell embodiment shown in FIG. 2 in which the electrodes are shown positioned for movement along an endless path passing through the corresponding electrolyte on each side of the dialysis membrane; and FIG. 4 is a schematic view of a portion of an electrodialysis cell illustrating the reaction occurring in the electrolyte on each side of the dialysis membrane in accordance with the invention.

It has now been found, in accordance with the present invention, that the reversible electrodialysis of solutions, preferably of ion disperse solutions in cells with one or several dialysis membranes between anode and cathode, whereby the solvent is decomposed, can be technically improved. Such reversible electrodialysis will advantageously take place, firstly, if electrodes are used as anode and cathode respectively, which only permit the reversible permeation of a distinct ion resulting from the solvent, and, secondly, if the substance produced by the evolution of the said ion of the solvent at one of the electrodes is led to the cell space of the electrode of opposite polarity and electrochemically solubilized at the said latter electrode.

Advantageously, in this case, no undesired decomposition product of the solvent is obtained as energy consuming waste product and the energy used up for the evolution of the substance produced from the ions resulting from the solvent at one electrode can almost substantially be regenerated by the subsequent dissolution at the other electrode of opposite polarity.

For the electrodialysis of aqueous systems, the electrodes can be selected as hereinafter described.

(1) Reversible hydrogen electrodes may be used as cathode and anode respectively. In this case, the hydrogen evolved at the cathode is led, via a piping, for example, from the cathode space to the anode, and is electrochemically solubilized by the latter. In this way, the $H^+$ ions resulting from the solvent are transferred from cathode space to anode for redissolving to form water so that no loss of energy substantially occurs during the over-all electrodialysis.

(2) Reversible oxygen electrodes may be used as anode and cathode respectively. Oxygen evolved at the anode is led, via a piping, for example, to the cathode and is cathodically solubilized. In this way, the $OH^-$ ions resulting from the solvent are transferred from anode space to cathode for redissolving to form water so that no loss of energy substantially occurs during the overall electrodialysis.

(3) Instead of a hydrogen electrode, which causes the transfer of $H^+$ ions between the electrolyte and the gaseous hydrogen phase, electrodes can be used which, in the manner of an accumulator, store hydrogen in atomic form. For this purpose, electrodes consisting of metals of the 8th group of the periodic table of Mendelejeff are suited. For instance, palladium forms a very high hydrogen-rich alloy-phase $PdH_{0.55}$, which, in contact with an aqueous electrolyte solution, exchanges $H_2$ reversibly with the latter. In the same manner, Raney nickel has the property of storing large amounts of atomic hydrogen (up to 1.2 hydrogen atoms/nickel atom) and to exchange the said hydrogen reversibly with an aqueous electrolyte solution. Nearly all metals of the 8th group, as aforesaid, as well as the metals of the 4th subgroup of the periodic table of Mendelejeff, for instance, titanium, show similar properties. If hydrogen storing electrodes are used, the said electrode, after being cathodically charged with hydrogen up to its storage capacity, is introduced into the anode space, therein anodically discharged and, after exhaustion of its hydrogen content, returned to the cathode space. In the same manner, an electrode initially used as anode, as soon as its hydrogen content is exhausted, is introduced into the cathode space and therein again cathodically charged. Accordingly, the cathode and anode are always operated in the proximity of the hydrogen potential corresponding to the fugacity characteristics of the hydrogen stored in the electrode metal.

(4) The practice described under (3) also finds application for operation with oxygen-storing electrodes. In this case, a silver-silver oxide electrode (generally used as positive electrode in silver/zinc accumulators) is especially well suited. In an alkaline medium, it is also possible to use hydroxide-electrodes of alkaline accumulators, for instance, nickel hydroxide, iron hydroxide and cadmium hydroxide. If the process according to the invention is performed with such electrodes, the $OH^-$ ions are the ions resulting from the solvent, which are evolved at the anode and thereafter reproduced electrochemically at the cathode.

The following equations may serve for a better understanding of the reaction mechanisms of the electrodes of groups 1 to 4.

Electrode 1: cathode, $H^+ + e^- \rightarrow \frac{1}{2}H_2(Me)$; anode, $\frac{1}{2}H_2(Me) \rightarrow H^+ + e^-$.

Electrode 2: cathode, $O_2(Me) + 2H_2O + 4e^- \rightarrow 4OH^-$; anode, $4OH^- \rightarrow O_2(Me) + 2H_2O + 4e^-$.

Electrode 3: cathode, $xH^+ + xe^- + yMe \rightarrow Me_yH_x$; anode $Me_yH_x \rightarrow yMe + xH^+ + xe^-$.

Electrode 4 (Example a): anode, $$2xOH^- + yMe \rightarrow Me_yO_x + xH_2O + 2xe^-$$

cathode,  (Example b); anode, $2[Ni(OH)_2] + 2OH^- \rightarrow 2[Ni(OH)_3] + 2e^-$; cathode, $2[Ni(OH)_3] + 2e^- \rightarrow 2[Ni(OH)_2] + 2OH^-$.

In these equations $x$ and $y$ are stoichiometric numbers, Me is the symbol for a metal. The expression $H_2(Me)$ means, that the hydrogen molecule is reacting at a metallic electrode, $O_2(Me)$ means, that the oxygen molecule is reacting at a metallic electrode.

Generally, all electrodes falling within the scope of the electrode groups described under (1) to (4) can be used in accordance with the process of the invention. It is self-evident that the electrodes used must be resistant toward the catholyte as well as the anolyte under the working conditions in the system.

It will be appreciated that the electrodes used as anode and cathode respectively need not necessarily consist of the same metal. They need only belong to the same group of hydrogen and oxygen electrodes, as pointed out hereinbefore. For instance, if an acid reacting electrolyte (anolyte) and an alkaline reacting catholyte are present, a platinum or palladium containing hydrogen electrode (anode) may be used. This may take the form of carbon-hydrogen electrode containing finely distributed Pt as catalyst, or a so-called double skeleton catalyst electrode containing Raney-Pd or Raney-Pt embedded in an acid resistant carrier skeleton of Pt, Pd or carbon. For the cathode, on the other hand, the use of noble metals can be dispensed with and instead electrodes, on the basis of nickel or iron, may be used. (See German Patent No. 1,019,361.)

In technical practice, the process according to the invention will preferably be combined with other processes.

The following examples may serve to aid in understanding the process according to the present invention.

EXAMPLE 1

Production of KOH solution from $K_2CO_3$ solution. This mode of application of the process according to the invention is highly important for the regeneration of carbonated electrolyte solutions of fuel cells in which carbon containing fuels, for instance, CO, $CH_4$, alcohols, formic acid and other fuels known for processing fuel cells, are electrochemically converted, producing as reaction product, for instance, $K_2CO_3$ from KOH electrolyte.

In this case, the anode space contains an aqueous solution of potassium carbonate. The anode space is separated from the cathode space by a cation exchange membrane having highly ionized $SO_3H$-groups in which the current transfer is substantially performed by the cation $K^+$. With 3 N KOH in the cathode space, this membrane still possesses a selective transference of 80% for $K^+$ ions.

The electrodialysis was performed with several electrodes (A) with hydrogen electrodes and (B) with oxygen electrodes.

(A) A double-skeleton catalyst valve electrode, according to U.S. application Serial No. 826,812, filed July 13, 1959, now U.S. Patent 3,201,282, was provided as hydrogen electrode (cathode) in the KOH-containing space; it supplied hydrogen with 1.5 atm. The electrode comprised a coarse pored working layer consisting of a supporting skeleton of nickel with Raney nickel granules embedded therein and a fine pored covering layer consisting of a skeleton of copper with Raney copper granules embedded therein. The electrode was produced by hot pressing the various substances in particle form in a mold, i.e., under the simultaneous action of pressure and elevated temperature.

For the working layer, a thorough mixture of 1 part by weight of Raney nickel alloy (50% by weight Ni/50% by weight Al, mean particle size $50\mu$ to $75\mu$ and 1.5 parts by weight carbonyl nickel powder for the supporting skeleton, was filled in a mold so as to be uniformly distributed therein. On this layer the starting material for the covering layer was evenly distributed. This covering layer mixture consisted of a thorough mixture of 1 part by weight of a Raney copper alloy (50% by weight Cu/50% by weight Al, mean particle size $<35\mu$) and 1.2 parts by weight copper powder for the supporting skeleton.

This material was compacted for 10 minutes with a molding pressure of 4 to/cm.² at 380° C. In this manner, an electrode with a working layer of 2 to 2.5 mm. thickness and a covering layer of 0.2 mm. thickness was produced.

As hydrogen-anode, a hydrogen-diffusion electrode, namely a double-skeleton catalyst electrode, was used which consisted of a supporting skeleton of silver wherein Raney palladium granules were embedded. This electrode had a surface of 1 cm.² and comprised three layers:

(1) A layer for supplying and distributing the gas produced from 1.5 g. of a mixture of fine silver powder (particle size about $3\mu$) and KCl-powder (particle size $<50\mu$), the mixing ratio being 4:1 by weight.

(2) A working layer, produced from 0.7 g. of a mixture of fine silver powder (particle size about $3\mu$) and powder of a Pd-Zn-alloy (Pd:Zn=70:30 by weight, particle size $20-35\mu$), the mixing ratio being 1:2 by weight.

(3) A covering layer, having the same composition as the working layer, except for the Pd-Zn-alloy having a particle size of $15\mu$.

The materials of the several layers were evenly distributed in a mold and compacted by hot pressing with a temperature of 400° C. and a pressure of 4 to/cm.².

This electrode limited the current strength since in the carbonate-bicarbonate solution it could only be loaded with 10 ma./cm.²

The cell voltage was 0.7 v. when the electrolyte in the anode space was 0.8 N with respect to $K_2CO_3$ and 2.6 N with respect to $KHCO_3$, whereas the cathode space contained 4.5 N KOH.

A working temperature of 25° C. was maintained. If higher temperatures (for instance, about 90° C.) are used, the current density can be increased without the occurrence of a substantial voltage loss.

In this device, hydrogen is evolved at the cathode during passage of current. This hydrogen recovered from the cathode is led via a closed piping system to the anode and electrochemically dissolved in the anode space.

During passage of direct current through the said dialysis cell, the reactions shown in FIG. 4 of the accompanying drawing occur. FIG. 4 of the drawing is a schematic diagram of an electrodialysis cell wherein A denotes the anode space, M the cation exchange membrane having highly ionized $SO_3H$ groups, and K the cathode space.

In this dialysis cell, the $K^+$ ions produced by dissociation of the potassium carbonate according to Equation I, are transferred through the membrane to the cathode space. The remaining $KCO_3^-$ ions react with water according to Equation II to form $KHCO_3$ and $OH^-$ ions. These hydroxyl ions deliver their electrons to the anode simultaneously forming water with the hydrogen $H_2(Me)$ present in the anode space according to Equation III, this hydrogen $H_2(Me)$ having been transported from the cathode space where it was generated according Equation V. Per equivalent of $K^+$ transferred to the cathode space therefore, one equivalent of surplus $CO_3^{--}$ ions is formed in the anode space. These $CO_3^{--}$ ions initially react with the anolyte, forming potassium bicarbonate and lowering the pH value until the $CO_2$ pressure equals the pressure in the cell. From this moment, surplus $CO_2$ is given off to the atmosphere; a stationary condition is obtained which is dependent on the temperature. Due to hydrolysis of potassium bicarbonate, this equilibrium shifts with increasing temperature towards the alkaline range according to the following:

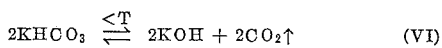

$$2KHCO_3 \underset{\rightleftharpoons}{<T} 2KOH + 2CO_2\uparrow \qquad (VI)$$

The $K^+$ ions transferred by the current to the cathode space react therein with the $OH^-$ ions to form KOH according to Equation IV. The $OH^-$ ions are formed at the cathode due to the electrochemical reduction of water to $H_2$ according to Equation V. $H_2$ is led to the anode where it is quantitatively anodically oxidized as described above.

In this manner, KOH solution is formed in the cathode space, which is continuously or intermittently removed, and $CO_2$ is formed in the anode space. Therefore, potassium carbonate must be continuously fed to the anode space and eventually water to the cathode space.

Instead of the electrodes mentioned above, other non-noble metal-containing electrodes can be used, for instance, double-skelton catalyst electrodes of nickel according to German Patent No. 1,019,361. In this case, it is preferable to perform the process according to the invention at increased temperature above 60° C. and eventually at superatmospheric pressure, since under these conditions the anolyte as well as the catholyte are maintained alkaline (B) Two oxygen electrodes were used in this instance in the dialysis cell. A Pt or carbon anode serves for the evolution of oxygen. The gas was collected from the anode space, freed of $CO_2$ by freezing out with Dry Ice in a cooling trap and led to the oxygen electrode provided in the KOH solution as cathode, where the same was quantitatively electrochemically redissolved.

The latter electrode was a double-skelton electrode according to Austrian Patent No. 207,429, comprising a supporting skelton produced from carbonyl nickel with Raney silver granules embedded therein. The cell voltage was about 1 v. at a current density of 100 ma./cm.² The cell voltage varied with the composition of the electrolyte solutions in the electrode spaces. The working temperatures were the same as mentioned above, under (A).

Carbon electrodes according to German Patent No. 957,491 are also well suited in this connection as oxygen electrodes.

Since oxygen electrodes do not work entirely reversibly during evolution as well as during dissolution, reversible working hydrogen electrodes are preferred.

EXAMPLE 2

Separation of KCl into KOH and HCl.

The electrodialysis experiment was performed at 40° C. in a device as described in Example 1, wherein each of the electrode pairs denoted under (A) and (B) were used in turn. At the end of this experiment, the cell voltage was 1.6 v. at a current density of 50 ma./cm.², if the electrode pair according to (A) was used. Under the conditions as described hereinbefore, the acid and the base were about one/normal. However, under these conditions a high back diffusion of the ions separated by the membrane was noticed.

In order to prevent the said back diffusion, the electrodialysis was again performed, but this time in a cell consisting of the cathode space containing 1 N KOH-electrolyte, a neutral space containing 1 N KCl-electrolyte and the anode space containing 1 N HCl-electrolyte. A cation exchange membrane similar to that of Example 1 (Permutit C 10) was provided between the cathode space and a neutral space, whereas a highly dissociated anion exchange membrane (Permutit A 10) was provided between the neutral space and the anode space. Owing to this fact, the inner resistance of the cell indeed was increased, but the separation efficiency and with it the current efficiency were substantially increased.

These examples are representative for a large number of processes of electrodialysis, which are well known by the skilled artisan.

The process according to the invention is concerned not only with the electrodialysis of aqueous solutions, but also with solutions of salts in other solvents, which behave similarly to water in ionizing the said salts.

Besides the electrodes named above, numerous other electrodes described in the literature are suited for performing the process according to the invention, for instance the electrodes of Bacon (U.S.A. Patent 2,716,670) or the electrodes of Kordesch (Meeting of the Am. Chem. Soc., Atlantic City, September 1959).

If the process according to the invention is performed with gas electrodes, the same quantity of gas must be dissolved at one electrode, as is evolved at the opposite electrode. Since small gas losses always occur during evolution as well as during electrochemical dissolution of gases, it is preferable to connect a hydrogen- or an oxygen-storage device with the piping system connecting the two gas electrodes, respectively.

By using the above-mentioned storage electrodes, some losses occur due to the fact that the current efficiency is less than 100%. In this case, the electrodes must be from time to time loaded outside the cell in order to compensate for this loss, if a deterioration of the electrode potential is noticed.

Specifically referring to the construction of FIG. 1, the catholyte is conducted through the inlet line 1 to the catholyte chamber of the cell adjacent the cathode 10 which takes the form of a gas diffusion electrode, such as that contemplated by Example 1(A). The spent catholyte is discharged from the cell through the outlet line 2. In the same way, the anolyte passes through the inlet line 3 in order to reach the anolyte space containing the anode 11 which may be a gas diffusion electrode, such as that shown in Example 1(A). The spent anolyte leaves the cell through outlet line 4. The electrodes are positioned against the cell housing 8 and the electrodialysis membrane 9 which may be a cation exchange membrane in accordance with Example 1(A) is positioned between the electrodes so as to separate the catholyte from the anolyte. Gas, such as hydrogen, evolved at cathode 10 is conducted from the electrode through branch lines 10', 10' and main line 10'' and introduced via main line 11'' and branch lines 11', 11' to the anode side of the cell for electrochemical dissolution at the anode. Line 5 is connected for introducing make up gas, such as hydrogen, for achieving an energy balance in the system. The electrodes are provided with suitable terminals in the usual way. Thus, hydrogen, which may be evolved at cathode 10, operating as a hydrogen separator electrode, circulates through the pipeline system without contact with the electrolyte to the anode 11, which in turn operates as a reversible hydrogen electrode where the hydrogen is electrochemically dissolved into the electrolyte once more under the corresponding energy gain occasioned thereby.

Of course, the device of FIG. 1 may also be used with other gases such as oxygen, whereby oxygen may be evolved at the anode and recirculated to the cathode for electrochemical dissolution, under the corresponding energy gain occasioned thereby (see Example 1(B)).

With respect to FIGS. 2 and 3, an electrodialysis cell having a housing 8' is shown which operates in the manner of an accumulator for the storage of gas in atomic form, such as hydrogen or oxygen. The individual electrodes take the form of horizontal strips spaced along a pair of parallel bands 7 which may be made of any material inert with respect to the electrolyte, such as plastic material. The bands should also act as electric insulators. The bands 7 carrying the electrode strips 6 pass over the rollers $R_1$, $R_4$, $R_3$, $R_2$, and $R_5$ so as to conduct the electrode strips 6 through the anolyte and catholyte spaces, such spaces being separated by the presence of the electrodialysis membrane 9'. The anolyte in this instance enters the anolyte space through the inlet line 1 and the spent anolyte is discharged through the outlet line 2. In the same way, the catholyte enters the catholyte space through the inlet line 3 and the spent catholyte leaves the catholyte space through the outlet line 4. Suitable terminals 12 and 13 are disposed in the corresponding cell spaces on each side of membrane 9' for sliding contact with a portion of the band 7 containing the electrode strip 6 so as to provide a completion of the circuit through the electrolyte with the electrode strips and the external circuit. Thus, assuming the band 7 travels in the direction along the rollers $R_1$, $R_4$, $R_3$, $R_2$, and $R_5$ and that the electrode strips are made of a material which stores hydrogen in atomic form, such as palladium, stored hydrogen will be given off at the anode electrode strips 6, 12 and the electrode strips 6, low in hydrogen, will pass from the anolyte space over rollers $R_4$ and $R_3$ to the catholyte space to accumulate or store further hydrogen at the cathode 13, 6. For best performance, of course, the bands 7 should be made of electrically insulating material which is also stable to the action of the electrolyte through which the same revolve in the course of operation. It is essential for close sliding contact to be made between the electrode strips 6 and the current conductors or terminals 12 and 13 as the case may be for suitable efficiency in operation. By reason of the sliding contact with the anode, a suitable current may be transmitted to the electrode strips 6 as they slide in contact therewith so that the electrode strips, which at this point are loaded with hydrogen in atomic form, may now contribute this hydrogen to the electrolyte (anolyte) by electrochemical dissolution. On the other hand, the electrode strips 6 which come in contact with the cathode are low in hydrogen by reason of the evolution of hydrogen at the electrode strips 6 sliding in contact with anode 12 and these strips 6 tape on hydrogen in atomic form at the cathode 13.

If desired, an additional charge of the electrode strips may be carried out with excess hydrogen introduced from the exterior of the cell through line 5 at a point above the feed lines 1 and 3 of the anolyte and catholyte respectively. The electrode strips passing in the portion of the cell above the level of the electrolyte may be suitably contacted with this excess hydrogen so that hydrogen will be taken up in atomic form for later use when the electrode strips reach the portion of sliding contact with the anode 12 for dissolution thereat.

The same type of operation will be effected with oxygen storing electrodes, such as electrodes made of silver-silver oxide, nickel hydroxide, etc. Thus, hydroxyl ions evolved as oxygen or stored in hydroxide form, as the case may be, at the anode may be transported through the cell and dissolved once more into the electrolyte electrochemically at the cathode.

What we claim is:

1. In a process of operation of an electrochemical cell having at least one dialysis membrane separating the anode and cathode electrodes of the cell for electrodialysis of aqueous electrolyte solutions in the cell wherein a member selected from the group consisting of hydrogen and oxygen is evolved as evolution product at one of said electrodes from the concomitant electrodialysis of water used as solvent during operation of the cell, the improvement which comprises operating such electrochemical cell under direct current supply thereto for electrodialysis of such aqueous electrolyte solution, such that hydrogen is cathodically formed, while effecting the electrodialysis in the presence of reversible electrodes serving as anode and cathode electrodes of the cell to achieve reversible electrodialysis of said water, such anode and cathode, respectively, being reversible accumulator electrodes of metals which are capable of storing hydrogen in atomic form and of electrochemically exchanging such hydrogen in the form of $H^+$ ions with aqueous electrolyte solutions, and transferring the hydrogen cathodically formed as evolution product from the electrodialysis of water and stored by the reversible electrode metal from the cathode side of the dialysis membrane to the anode side thereof and electrochemically redissolving said hydrogen thereat to reduce the energy requirement for effecting the over-all electrodialysis, by exchanging the two electrodes of the cell with one another and thereby changing the polarities of the two said electrodes.

2. In a process of operation of an electrochemical cell having a dialysis membrane separating the anode and cathode electrodes of the cell for electrodialysis of aqueous $K_2CO_3$ solutions in the cell, wherein hydrogen is evolved at one of said electrodes from the electrodialysis of ions of water used as solvent during operation of the cell, the improvement which comprises operating such electrochemical cell under direct current supply thereto for electrodialysis of such $K_2CO_3$ solution while effecting the electrodialysis in the presence of reversible electrodes serving as anode and cathode electrodes of the cell to achieve reversible electrodialysis of said water, conducting the hydrogen obtained from the electrodialysis of water at the reversible electrode on one side of the dialysis membrane in the cell to the reversible electrode of opposite polarity on the other side of said membrane in the cell, and electrochemically redissolving such hydrogen thereat into ions once again to reduce the energy requirement for effecting the over-all electrodialysis.

(References on following page)

References Cited by the Examiner

UNITED STATES PATENTS

| | | | |
|---|---|---|---|
| 2,070,612 | 2/1937 | Niederreither | 204—129 |
| 2,273,795 | 2/1942 | Heise et al. | 204—98 |
| 2,708,658 | 5/1955 | Rosenberg. | |
| 2,749,293 | 6/1956 | Wahlin | 204—73 |
| 2,827,426 | 3/1958 | Bodamer | 204—98 |
| 2,829,095 | 4/1958 | Oda et al. | 204—103 |
| 2,860,175 | 11/1958 | Justi | 204—284 |
| 2,913,511 | 11/1959 | Grubb | 136—86 |
| 2,928,891 | 3/1960 | Justi et al. | 204—129 |
| 3,014,084 | 12/1961 | Ciarlariello | 136—86 |
| 3,124,520 | 3/1964 | Juda | 204—151 |

OTHER REFERENCES

Heise, "Transactions of The Electrochemical Society," vol. 75, (1939), pgs. 147–166.

JOHN H. MACK, *Primary Examiner.*

JOHN R. SPECK, WINSTON A. DOUGLAS, T. TUNG, *Assistant Examiners.*